United States Patent [19]
Matsumoto

[11] Patent Number: 5,404,445
[45] Date of Patent: Apr. 4, 1995

[54] EXTERNAL INTERFACE FOR A HIGH PERFORMANCE GRAPHICS ADAPTER ALLOWING FOR GRAPHICS COMPATIBILITY

[75] Inventor: John Matsumoto, Encinitas, Calif.

[73] Assignee: Toshiba America Information Systems, Inc., Irvine, Calif.

[21] Appl. No.: 785,935

[22] Filed: Oct. 31, 1991

[51] Int. Cl.⁶ ............................................. G06F 15/20
[52] U.S. Cl. .................................... 395/162; 395/163; 395/166; 395/325
[58] Field of Search .............................. 395/162-164, 395/166, 325, 275, 400, 425; 340/798-800; 345/112, 133, 185, 191, 197, 203

[56] References Cited

U.S. PATENT DOCUMENTS

| | | | |
|---|---|---|---|
| 4,905,167 | 2/1990 | Yamaoka et al. | 358/140 |
| 4,958,378 | 9/1990 | Bell | 382/34 |

FOREIGN PATENT DOCUMENTS

0371231A3  6/1990  European Pat. Off. .

OTHER PUBLICATIONS

Inmos, "XGA Software Programmer's Guide", 1st ed. 1991, 72 OZK 25800 (Sep. 1991).
Texas Instruments, "TMS 34020, TMS 34020A, Graphics System Processors", SPVS004B (Mar. 1990—Revised Oct. 1990).
Texas Instruments, "TMS 34020 User's Guide", 2564006—9721 revision (Aug. 1990).
Ross, "First Looks: $995 TIGA 34020 Graphis Adapter", PC Magazine, Jan. 29, 1991, at 48.
Poor, "1,024–by–768 Coprocessed Graphics Adapters: High Resolution and High Speed", PC Magazine, Jun. 25, 1991, at 103–157.
English Abstract of Japanese Publication No. JP3129477, published Jun. 3, 1991.
English Abstract of Japanese Publication No. JP60129868, published Jul. 11, 1985.

*Primary Examiner*—Mark R. Powell
*Assistant Examiner*—Kee M. Tung
*Attorney, Agent, or Firm*—Banner, Birch, McKie & Beckett

[57] ABSTRACT

An interface for a high-performance graphics adapter is provided in a computer system which includes a host processor, a coprocessor in the form of a graphics system processor, and memory addressable by both host and co-processors. An application computer program running on the host processor utilizes a graphics operating system, such as a Video Graphics Array Basic Input/Output System (VGA BIOS) to write graphics data in VGA format to the memory. A tactical address controller translates memory addresses generated by the VGA BIOS (and hence the host processor) into memory addresses recognized by the coprocessor. One or more graphics controllers store the graphics data, expanded into VGA format, into a VGA video random-access memory (RAM) buffer. A Format Translator, under the direction of the graphics system processor, then translates the VGA graphics data in the video RAM buffer into a packed pixel form, and the graphics data is displayed on a cathode ray tube (CRT).

65 Claims, 7 Drawing Sheets

EXTERNAL INTERFACE FOR A HIGH PERFORMANCE GRAPHICS ADAPTER ALLOWING FOR GRAPHICS COMPATIBILITY

BACKGROUND OF THE INVENTION

1. Field of the Invention

The present invention generally relates to an interface for a high performance graphics adapter, and more particularly, to an apparatus and method for interfacing a computer system to a high performance graphics adapter and for providing compatibility for the graphics adapter with other, more commonly available, graphics formats.

2. Description of the Prior Art

In a conventional computer system, such as an "IBM compatible" microcomputer, graphics adapters are provided to serve as an interface between an application program operating on the computer system and a visual output medium, such as a cathode ray tulle (CRT) or flat panel display. Examples of such graphics adapters currently in widespread use are those that utilize various types of graphics formats, such as EGA, VGA, MCGA, Hercules, 8514/A, etc. Many of these types of graphics adapters have become de facto industry standards.

For example, VGA graphics adapters are used extensively by microcomputers to provide reasonably high resolution multi-color graphics on a compatible CRT monitor. The VGA standard, as normally implemented, allows up to 16 different colors to be displayed simultaneously from a palette of over 256,000 different color combinations, and at a resolution of 640 pixels horizontally and 480 vertically. At lower resolutions, an even greater number of colors may be displayed simultaneously. In addition, some extensions to the VGA standard allow for a resolution beyond the standard 640 by 480 normal resolution.

Because of the relatively high resolution and color flexibility found in the VGA standard, this and other similar standards, such as EGA, have become very popular among computer owners seeking high performance graphics at reasonable prices. However, as is common with other aspects 17 computer technology, significant improvements have been made in recent years with respect to graphics adapters. Notable among these improvements is the introduction of advanced, high-speed dedicated graphics system processors (GSPs), capable of providing advanced graphics capabilities at high speeds. These GSPs provide in a minimal number of integrated circuit packages many types of advanced graphics capabilities previously only achievable by utilizing multiple integrated circuit packages or emulating such functions in software. Moreover, these GSPs are able to provide such functionality at speeds greatly exceeding what was previously possible.

One such example of a GSP is a member of the TMS340×0 family of graphics system processors available from Texas Instruments of Dallas, Texas (collectively referred to as the "340×0"), and its regional offices. Specific examples of this processor family include the 34010 first generation processor and the 34020 second generation processor. The 340×0 family is an advanced, 32-bit internal data path microprocessor, optimized for graphics display systems, and capable of being used with the Texas Instruments Graphics Architecture (TIGA), a software interface that standardizes communication between application software and all TMS340×0-based hardware for "IBM-compatible" personal computers. The capabilities of the 340×0 represent a major improvement in speed and power over previously existing graphics processors, including VGA graphics processors.

While the use of the 340×0 GSP may provide many advantages over graphics adapters such as those utilizing the VGA standard, the 340×0 is unfortunately incompatible with the previous graphics standards (such as VGA) from an addressing and data format point of view. Specifically, VGA uses a special addressing scheme developed by IBM, while the 340×0 uses a conventional linear addressing scheme. In addition, VGA uses a special video data storage scheme developed by IBM to store information about each picture element (pixel), while the 340×0 uses a more conventional "packed pixel" format whereby each piece of pixel information is "packed" next to one another. Thus, the 340×0 GSP is unable to effectively operate upon graphics data generated by an application computer program operating on an associated host microprocessor when the graphics data is designed for use with a VGA graphics adapter.

To circumvent this limitation, several display adapters have been developed recently which allow for the alternative use of the advanced capabilities of GSPs, such as the 340×0 processor, while including additional redundant circuitry to support more standard graphics standards such as VGA. For example, some of these adapters are based on the 340×0 processor as well as an on-board VGA chip set. The user may manually select whether the 340×0 GSP will be utilized (via TIGA) or whether the VGA circuitry will be utilized through the use of a software setup utility.

In another arrangement, display adapters have previously been developed utilizing both 340×0 circuitry as well as VGA circuitry which may automatically utilize the appropriate circuitry depending upon what type of data is received. In this case, if TIGA data is received by the adapter, the 340×0 circuitry is used. On the other hand, if VGA data is received, this data is "passed through" to the VGA circuitry.

In both cases described above, because the 340×0 circuitry and the VGA circuitry operate wholly independently from one another, redundant circuitry is needed when both the 340×0 GSP and VGA circuitry are designed to be implemented within the same display adapter. Similar functions common to both types of formats are repeated for both the 340×0 and VGA. For example, a CRT controller, a sequencer, etc. are needed in both environments, and these components must therefore be duplicated in different forms for each of the 340×0 and VGA systems. This contributes to higher costs for manufacturing such adapters.

Therefore, it would clearly be advantageous to eliminate the inherent redundancy in having a complete 340×0 system as well as a complete VGA system located within the same display adapter. As described below, the present invention effectively addresses this problem.

SUMMARY OF THE INVENTION

It is therefore an object of the present invention to provide an interface for a graphics system processor which allows the graphics system processor to display graphics data created for another graphics environment.

It is a further object of the present invention to provide an interface for a TIGA-compatible graphics system processor which allows the graphics system processor to display graphics data in VGA format.

It is another object of the present invention to provide an interface for a microprocessor, such as a graphics system processor, which allows the microprocessor to address data, such as graphics data, stored in an addressable format incompatible with the microprocessor.

It is yet another object of the present invention to provide an interface for a TIGA-compatible graphics system processor which allows the microprocessor to address graphics data stored in an IBM addressable graphics format.

It is yet another object of the present invention to provide an interface for a microprocessor, such as a graphics system processor, which allows the microprocessor to read data, such as graphics data, stored in a data format incompatible with the microprocessor.

It is yet another object of the present invention to provide an interface for a TIGA-compatible graphics system processor which allows the microprocessor to read graphics data stored in VGA data format.

In accordance with the present invention, an interface for a high-performance graphics adapter is provided which allows for graphics compatibility with another type of graphics environment. In a preferred embodiment, the interface is used in a computer system which includes a host processor, a coprocessor in the form of a graphics system processor, and memory addressable by both host and co- processors. An application computer program running on the host processor utilizes a graphics operating system, such as a Video Graphics Array Basic Input/Output System (VGA BIOS) to write graphics data in VGA format to the memory, or the software application may write directly to the video memory, bypassing the BIOS. A tactical address controller translates memory addresses generated by the VGA BIOS or the direct access by the application (and hence the host processor) into memory addresses recognized by the coprocessor. One or more graphics controllers store the graphics data, expanded into VGA format, into a VGA video random-access memory (RAM) buffer. A Format Translator, under the direction of the graphics system processor, then translates the VGA graphics data in the video RAM buffer into a packed pixel form. The packed pixel data is then placed into a separate video frame buffer and displayed on a CRT, flat panel, or any other sequential viewing device.

A more complete appreciation of the present invention and many of its attendant advantages will be readily obtained as the invention becomes better understood by reference to the following detailed description when considered in connection with the accompanying drawings.

DETAILED DESCRIPTION

Figure 1:
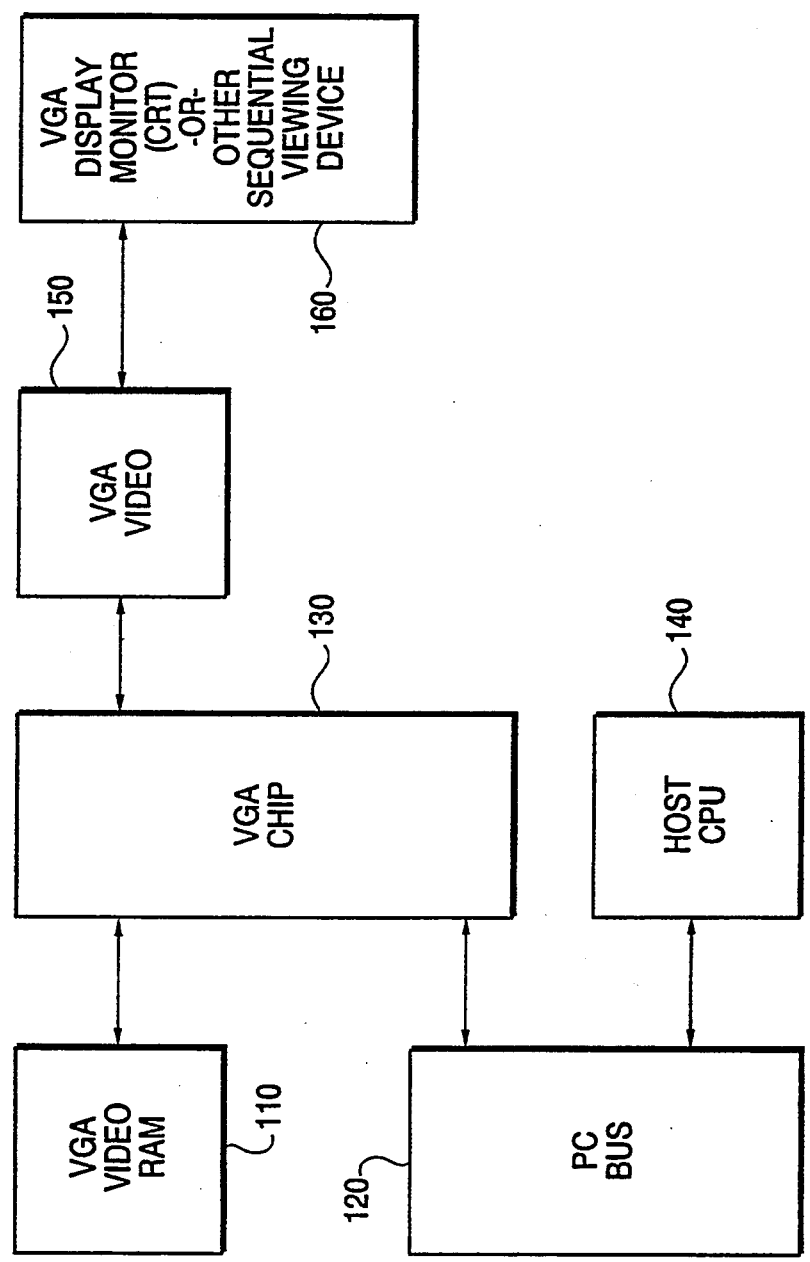
FIG. 1 illustrates a block diagram of a VGA graphics system known in the prior art.

In order to appreciate the detailed discussion that follows, the following terms will now be defined:

ATTRIBUTE CONTROLLER: Under VGA, the attribute controller supports a 16-color palette, controls the attribute mode, controls horizontal pixel panning, as well as other related functions.

BIT-PLANE FORMAT: Under VGA, special hardware logic in the video system, in the form of a GRAPHICS CONTROLLER, mediates accesses to pixels stored in the VIDEO RAM BUFFER in one of four bit planes (maps). The graphics-mode bit planes are addressed in parallel—when a CPU read or write is performed at a particular address in the VIDEO RAM BUFFER, the address refers to four bytes, instead of one byte, each byte being in one of the bit planes. The 34020 Graphics System Processor does not utilize the bit-plane format, but instead utilizes the PACKED PIXEL FORMAT.

CATHODE RAY TUBE (CRT): Any one of many types of readily available output devices, capable of displaying graphical information from a video display system, which receives its data in a sequential manner. For purposes of the present invention, the CRT is capable of displaying graphical information generated by a 34020 GSP based video display system.

CATHODE RAY TUBE CONTROLLER (CRTC): The CRTC generates horizontal and vertical timing signals, as well as increments a video buffer address counter at a rate synchronized with the timing signals. In conjunction with the CRTC, the video display circuitry reads data from the VIDEO BUFFER using the CRTC's address value, decodes the data, and sends the resulting color and brightness signals to the monitor along with the CRTC's timing signals. In addition, the CRTC determines the position of a cursor on the CRT.

CENTRAL PROCESSING UNIT (CPU): The CPU is a microprocessor which forms the central control circuitry in the computer system. For purposes of the present invention, the CPU acts as the host processor upon which an application may run which generates graphical output in either VGA format, or in TIGA format.

DIGITAL-TO-ANALOG CONVERTER (DAC): Under VGA, the video DAC generates the analog signals from digital counterparts to display the various colors on the CRT.

GRAPHICS CONTROLLER: Under VGA, the graphics controller mediates data flow between the VGA VIDEO RAM BUFFER and the CPU during video memory read or writes, and between the VGA VIDEO RAM BUFFER and the ATTRIBUTE CONTROLLER during active display times. Specifically, in one of its modes, the graphics controller is able to access graphics data in a BIT-PLANE FORMAT. When a particular address in the video buffer is read from or written to, the address refers to not one byte, but to four bytes, one in each bit plane.

GRAPHICS SYSTEM PROCESSOR (GSP): A microprocessor optimized for graphic display systems. For purposes of a preferred embodiment of the present invention, a GSP may be a TMS34020 GSP coprocessor, which is an advanced 32-bit microprocessor and is the second generation of the TMS340×0 family of GSPs available from Texas Instruments. However, it shall be understood that any member of the TMS340×0 family of GSPs, or any other type of GSP may just as easily be utilized for purposes of the present invention. For background informational purposes, a detailed discussion of the TMS34020 GSP is present in the book "TMS34020 User's Guide", available from Texas Instruments of Dallas, Tex., and/or through its regional offices.

HARDWARE REGISTERS: External I/O means for communicating with external hardware. In order to utilize hardware registers, a program operating on a host CPU may read and/or write to an I/O address, connected to which is external register hardware which couples the signals to the appropriate device(s).

PACKED PIXEL FORMAT: Method of storing pixels in video memory where each pixel is "packed" one next to another. This format may be contrasted to BIT-PLANE FORMAT.

SEQUENCER: Under VGA, the sequencer generates internal timings for video RAM addressing so as to arbitrate the usage of the bus between the host CPU and the CRTC.

TEXAS INSTRUMENTS GRAPHICS ARCHITECTURE (TIGA): TIGA is a software interface that standardizes communication between application software and all TMS340×0 GSP family-based hardware for IBM-compatible microcomputers. The TIGA interface is increasingly becoming a standard for high performance graphics applications, and is commonly known to those of ordinary skill in the art. For background informational purposes, a detailed discussion of the TIGA interface format is present in the book "TIGA Interface User's Guide", available from Texas Instruments of Dallas, and/or through its regional offices.

VIDEO RAM BUFFER: The video RAM buffer is a block of random access memory (RAM) addressable by both the host CPU and the video system. The video system's display circuitry updates the CRT's screen by continually and repeatedly reading the data stored in the video RAM buffer. At the same time, an application program executing on the host CPU may change the contents of the video RAM buffer.

VIDEO GRAPHICS ARRAY (VGA): VGA is a video subsystem available for "IBM-compatible" microcomputers which allows for high resolution graphics modes (at least 640 by 480 pixels) supporting multiple colors (at least 16 or 256 simultaneous colors from a palette of over 256,000 colors). The VGA format for outputting graphics data has become somewhat of a de facto standard in recent years, and is commonly known to those of ordinary skill in the art. For background informational purposes, a detailed discussion of the VGA system is present in Richard Wilton's book "Programmer's Guide to PC and PS/2 Video Systems", published by Microsoft Press, A Division of Microsoft Corporation, One Microsoft Way, Redmond, Wash. 98052-6399, as well as the "IBM Personal System/2 Model 80 Technical Reference", published by International Business Machines (IBM).

Referring to FIG. 1, a block diagram is shown of a microcomputer, such as an "IBM-compatible" microcomputer, having VGA circuitry, as is commonly known in the prior art. Referring to this diagram, the following elements are shown: VGA video RAM 110 (defined above), PC Bus 120, VGA Chip 130, Host CPU 140 (defined above), Video DAC 150 (defined above) and Video Display Monitor (CRT) 160 (defined above). The basic interaction of these components will now be described in some detail.

VGA Chip 130 is connected to Host CPU 140 through PC Bus 120. Host CPU 140 most commonly consists of an Intel 80×86-compatible microprocessor as commonly found in "IBM-compatible" microcomputers. PC Bus 120 consists of one of the various industry standard bus architectures found in such class of microcomputers.

VGA Chip 130, which is readily available in the marketplace, comprises four different overall portions: a cathode ray tube controller (CRTC), a sequencer, a graphics controller, and an attribute controller. The definitions of each of these components of VGA Chip 130 are provided above in the definition section.

In operation, Host CPU 140 is responsible for updating VGA Video RAM 110 with graphics information generated by an application running on the Host CPU 140. Through the arbitration function performed by the sequencer (within VGA Chip 130), the CRTC (also within VGA Chip 130) "simultaneously" moves the graphics data from VGA video RAM 110 to Video DAC 150.

When Host CPU 140 writes to VGA Video RAM 110, VGA Chip 130 performs both (1) an address bit line convolution on the address generated by Host CPU 140 which references an address in VGA Video RAM 110, and (2) an expansion from 8 bits to 32 bit "bit-plane format" (via the graphics controller). These two operations are unique to VGA, and their ramifications with respect to the present invention will be explained further below.

Figure 2:
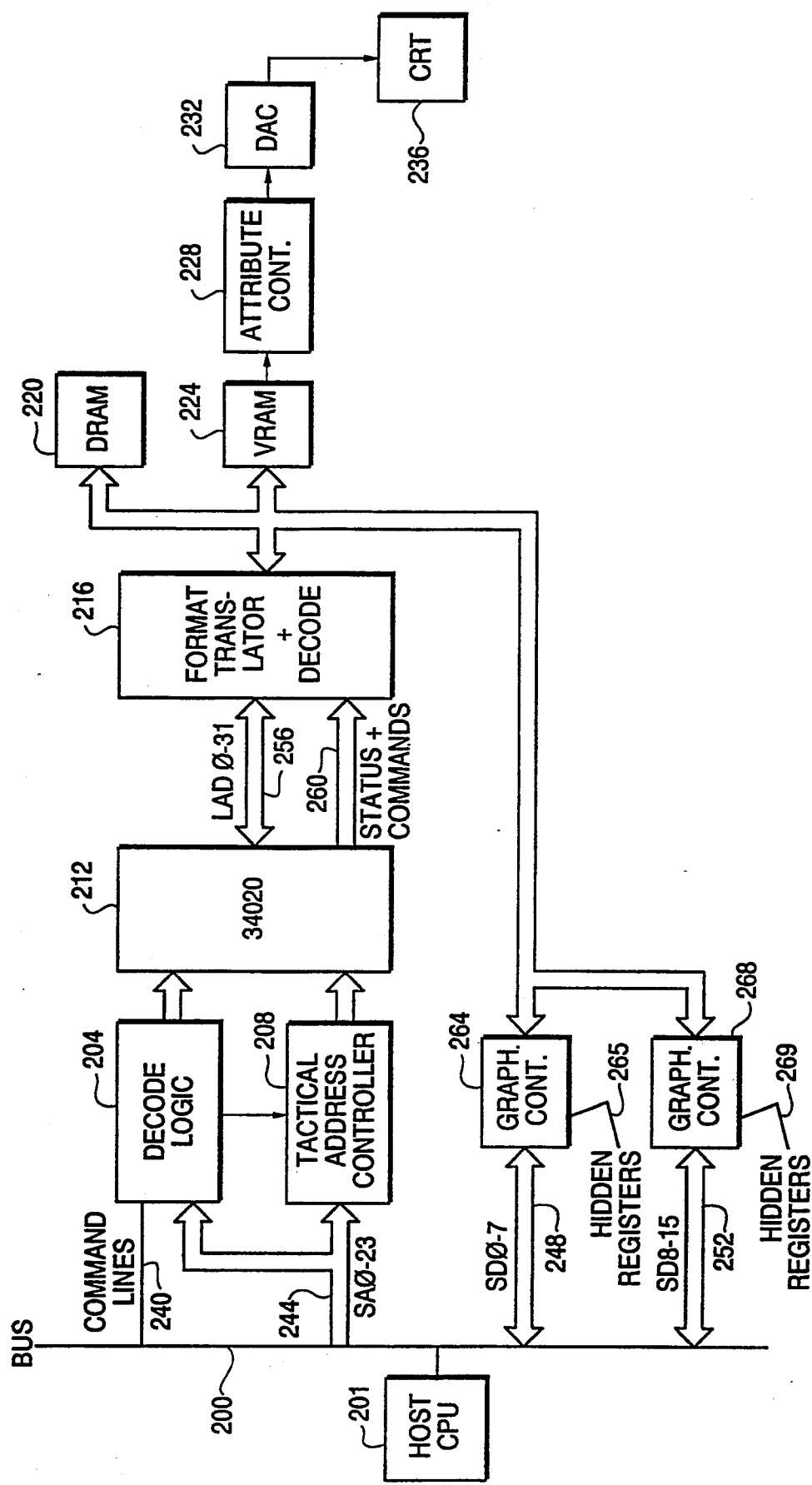
FIG. 2 depicts a block diagram showing the various components of the present invention in a preferred embodiment.

Referring now to FIG. 2, a block diagram is shown depicting the present invention in a preferred embodiment. Specifically, FIG. 2 illustrates the present invention constituting an interface between an application computer program running on a host CPU 201 and the 34020 graphics system processor (GSP) 212. In order to understand the functionality of the present invention, the various parts of FIG. 2 will now be explained.

First, it is important to note that the 34020 GSP could software emulate the VGA system without the use of Tactical Address Controller 208, Format Translator 216, and related components, but the performance would be extremely poor. Thus, hardware circuitry is provided according to a preferred embodiment of the present invention to improve performance.

Bus 200 is located within the microcomputer with which the present invention is designed to operate. In a preferred embodiment, this bus comprises an Extended Industry Standard Architecture (EISA) bus, as commonly utilized in microcomputer architectures. However, as will be understood by one of ordinary skill in the art, any other type of bus may just as easily be used, such one conforming to the Industry Standard Architecture (ISA), Microchannel Architecture (MCA), etc.

Coupled to bus 200 is a host CPU 201, which in a preferred embodiment comprises a microprocessor from the Intel 80×86-compatible family. This CPU forms the center of the host microcomputer, and is connected to bus 200 so as to be able to address, read from, write to, etc. memory and other devices coupled to bus 200. Of course, this microprocessor could consist of one or more of a multitude of commonly available microprocessors available on the market, and it will be seen by one of ordinary skill that the specific type of microprocessor used is irrelevant to the implementation of the present invention.

Decode logic 204 and Tactical Address Controller (TAC) 208 form the components of the present invention which perform the memory address conversions necessary for Host CPU 201 to access VGA graphics data written by the host CPU's application program. TAC 208 performs the actual memory address conversions while Decode Logic 204 effectively instructs TAC 208 whether such memory conversions are necessary. Decode Logic 204 and TAC 208 will be discussed in further detail below under the appropriate heading.

Graphics System Processor (34020 or GSP) 212 forms the central processing component for the graphics display system of the present invention. As previously discussed, GSP 212 consists of a 34020 GSP available from Texas Instruments.

Format Translator and Decode Logic (Format Translator) 216 form the components of the present invention which perform the graphics data format conversions necessary for the 34020 GSP to access VGA graphics data written by the host CPU's application program. Format Translator 216 performs a conversion function analogous to the conversion function performed by TAC 208 on the memory address where such graphics data resides. That is, after TAC 208 converts a memory address generated by Host 201 so as to retrieve a piece of graphics data previously written in VGA format, Format Translator 216 further converts the piece of graphics data from a VGA format to a format accessible to GSP 212. Further details of these processes will be provided later in this discussion.

Graphics Controllers 264 and 268, and their respective access to Hidden Registers 265 and 269, are responsible for managing the transfer of graphics data between the CPU and the VGA frame buffer, which is stored in Dynamic Random Access Memory (DRAM) 220 (described in further detail below). Graphics controllers 264 and 268 perform similar functions to the graphics controller within a VGA chip (discussed previously), but implemented in a slightly different format, as will be discussed below.

Dynamic Random Access Memory (DRAM) 220 represents, for purposes of the present invention, the portion of memory where the host CPU places graphics data in VGA format. Conversely, Video Random Access Memory (VRAM) 224 represents video-type RAM (having a serial output port) in which graphics data in 34020 GSP format is placed. This data may be generated either directly by GSP 212 under control of the host CPU (when TIGA is used) or may be generated by converting VGA graphics data located in DRAM 220 which was previously placed under the direction of the host CPU (when VGA is used). This interaction of these components will be explained in further detail under the appropriate heading.

Finally, Attribute Controller 228 and DAC 232 perform similar functions as their counterparts in the VGA Chip 130 of FIG. 1, previously described. These components produce output on Cathode Ray Tube (CRT) 236, which is a video monitor compatible with the high performance 34020 GSP 212. These components will also be discussed in further detail later.

Overall Operation of the Present Invention

Referring back to FIG. 2, the overall operation of the present invention in a preferred embodiment will now be discussed. For purposes of describing the operation of present invention, it will be assumed that a computer program application is operating on the host CPU 201 which is coupled to the main system bus 200. Examples of such a program may include popular software packages readily available in the marketplace, such as spreadsheets, word processors, graphing packages, etc. One of ordinary skill in the art will recognize that the type of application running on the host CPU is irrelevant for purposes of the present invention—only the application's output graphics operations are relevant when discussing the operation of the present invention.

In a preferred embodiment, the application program running on the host CPU generates graphical output in either (1) Video Graphics Array (VGA) or (2) Texas Instruments Graphics Architecture (TIGA) format. In the former case, the application program is able to utilize the various graphics functions available through interrupt calls (via interrupt 10 hex, etc.) to the VGA Basic Input/Output System (BIOS), which is in common use in virtually all microcomputers having the capability of displaying graphics in the VGA format, or the application may directly access the VGA I/O registers or VGA memory. In the latter case, the application may utilize the normal VGA BIOS, a special TIGA BIOS, or may also use a special BIOS which allows for graphics processing to be performed on both the host CPU and the GSP. These scenarios will be discussed further below.

In the first instance, the application program running on Host CPU 201 writes data to the VGA video RAM buffer in VGA format. Because the VGA video RAM buffer according to the present invention will not be directly displayed, but will rather be translated into a form displayable by the 34020 GSP, the VGA video RAM buffer may reside in Dynamic Random Access Memory (DRAM 220), rather than Video RAM (VRAM 224). However, the present invention could be implemented just as easily with only VRAM 224 and not DRAM 220, whereby the VGA video RAM buffer may reside in an unused portion of the VRAM.

In order to write data to the VGA video RAM buffer in VGA format, the VGA BIOS operating on Host CPU 201 sets "hidden registers" in order that the VGA graphics data written in response to the Host CPU application program may be properly expanded into the 32 total bits of the four bit planes of the bit plane format, previously described. This format corresponds to the format normally used by VGA in many of its operating modes.

Thus, Host CPU 201, under control of the VGA BIOS, sets hidden registers 265 and 269 to direct Graphics Controllers 264 and 268 to expand the graphics data to be stored in the VGA video RAM buffer into the 32 bit four bit-plane format. Thereafter, the VGA BIOS stores the graphics data through data lines 248 and 252 into DRAM 220.

In order to translate the graphics data stored in the bit-plane format in DRAM 220 into the packed pixel format recognized by the 34020 GSP (212), Format Translator 216 is thereafter utilized, at the direction of GSP 212. Format Translator 216 reads the data in bit-plane format from DRAM 220, translates, and stores the resulting graphics data into VRAM 224. Attribute Controller 228 and Video DAC 232 then read the resulting graphics data and output the proper signals to CRT 236.

In order to operate upon the VGA graphics data stored in DRAM 220, GSP 212 must necessarily utilize, in a preferred embodiment, native machine-language instructions. Such instructions are, in a preferred embodiment, stored in DRAM 220 along with the VGA graphics data. Therefore, in this configuration, Format Translator 216 must necessarily be able to distinguish between machine-language instructions read from DRAM 220 and graphics data to be translated into packed pixel format. As a result, decode circuitry must be built into Format Translator 216, as will be discussed below.

Additionally, because of the unique addressing scheme utilized by the VGA format, special circuitry is utilized in a preferred embodiment to translate memory addresses generated by Host CPU 201 into addresses applicable to the format under which VGA graphics data is stored. Specifically, under different modes of the VGA format, the normal address lines used in storing graphics data are transposed (convoluted). On the other hand, the 34020 GSP utilized in a preferred embodiment utilizes a linear address scheme. Accordingly, Tactical Address Controller 208 and accompanying Decode Logic 204 are used in a preferred embodiment to properly control addresses generated by Host CPU 201. This circuitry will be discussed in detail below, as well.

The Tactical Address Controller

Figure 3:
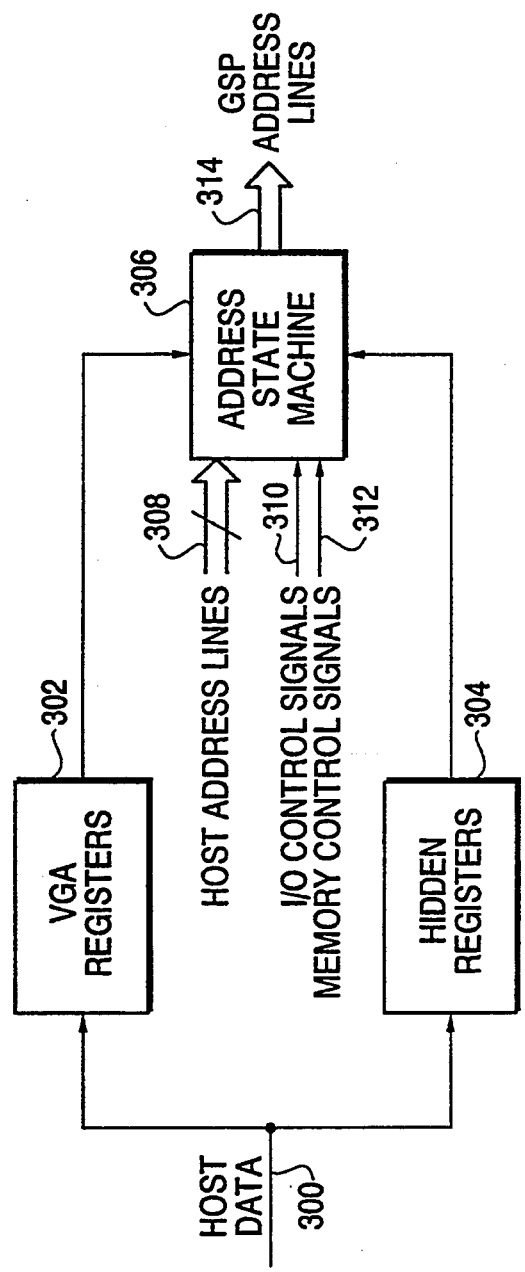
FIG. 3 is a block diagram showing in detail the tactical address controller depicted in FIG. 2.

Referring to FIG. 3, the Tactical Address Controller (TAC) (element 208 in FIG. 2) and accompanying Decode Logic (element 204 in FIG. 2) are depicted, combined into Address State Machine 306, VGA Registers 302 and Hidden Registers 304. First, VGA Registers 302 correspond to standard VGA registers in the video system. With VGA, these registers may be utilized by the application program and VGA BIOS to perform various functions within the video system, such as control the attribute controller, the CRT controller, the sequencer and the graphics controller. Therefore, in order to maintain compatibility with VGA, these registers must be present.

Next, Hidden Registers 304 are included in a preferred embodiment of the present invention to provide a means to communicate with the Tactical Address Controller (TAC) and the Graphics Controller of the present invention. Because the TAC and Graphics Controller must necessarily be controlled based upon whether Host CPU 201 is sending graphics data in VGA or 34020 (TIGA) format, Hidden Registers are included at normally unused I/O addresses, and may only be accessed through a unique combination of reads and writes to effectively "unlock" the register. In this way, Hidden Registers 304 will not conflict with the other registers (such as VGA Registers 302), and will not be inadvertently accessed by an executing program. Thus, Hidden Registers 304 make the TAC fully programmable, as will be described in further detail below.

Finally, Address State Machine 306 is present in the TAC to perform any necessary convolution in the addresses generated by the Host CPU. Based upon the status of VGA Registers 302, Hidden Registers 304, Host Address Lines 308, I/O Control Signals 310 and Memory Control Signals 312, Address State Machine 306 pipes through the appropriate address lines to the Graphics System Processor (element 212 in FIG. 2) via GSP Address Lines 314, so as to generate appropriate VGA addresses when in a VGA mode. Additionally, Address State Machine 306 adds any necessary address bits to properly place the graphics data from the Host CPU into the appropriate GSP memory space.

In operation, then, the Host CPU generates addresses on Host Address Lines 308, and through the use of input signals from VGA Registers 302, Hidden Registers 304, I/O Control Signals 310 and Memory Control Signals 312, appropriate addresses are generated on GSP Address Lines 314 by the TAC. After these addresses are generated, an appropriate read or write enable signal is provided to the GSP (element 212 of FIG. 2) so that data is either read from or written to either the DRAM or VRAM (elements 220 and 224 in FIG. 2) through the Graphic Controllers (elements 264 and 269 in FIG. 2)

Figure 4:
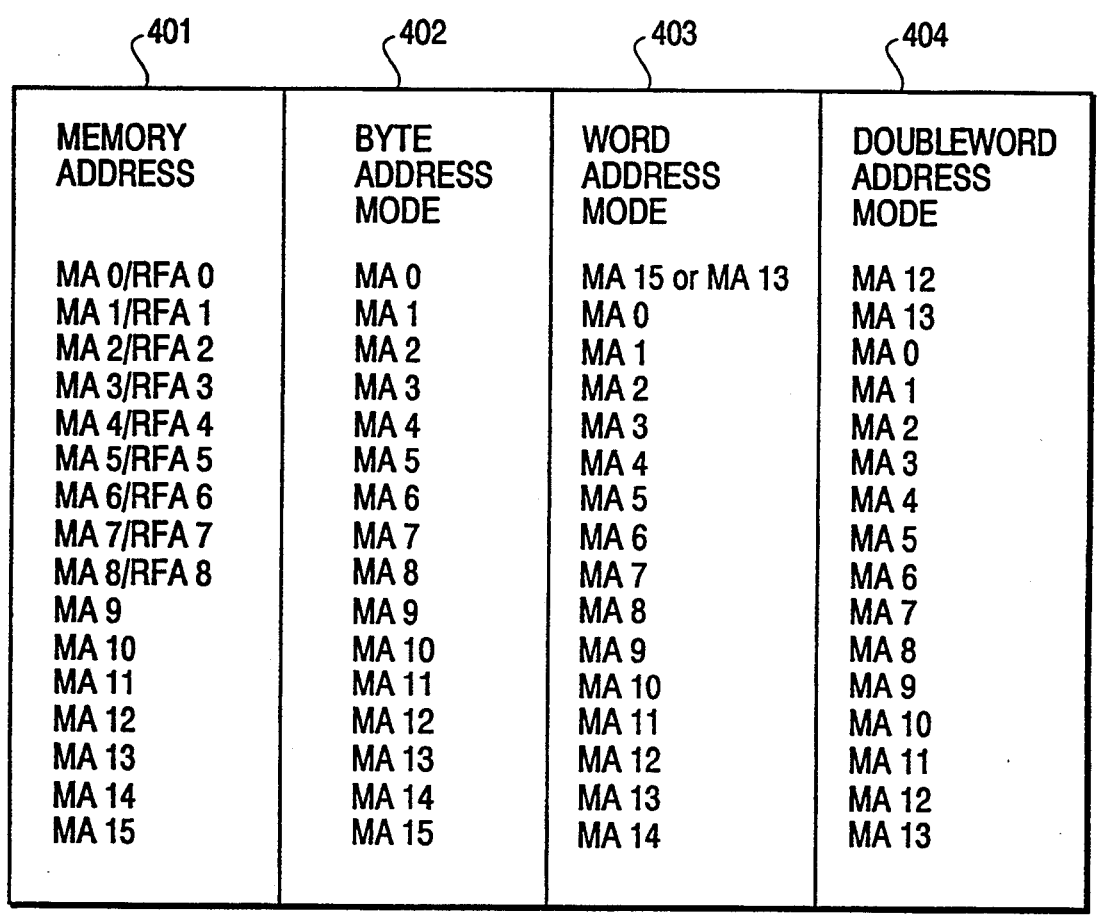
FIG. 4 is a table showing the various address modes available in a VGA system and emulated in a preferred embodiment of the present invention.

Referring to FIG. 4, a table is shown which depicts some of the convolutions which are performed on the video memory under VGA. Specifically, column 401 refers to a 16-bit memory address generated by the Host CPU. Referring to column 402, the "Byte Address Mode" is shown corresponding to one of three addressing modes which VGA may use to store graphics data in video memory. The "Byte Address Mode" corresponds to the situation where no convolution of the 16-bit address takes place.

Column 403, labelled "Word Address Mode", corresponds to one of the two modes where address convolution takes place (the other mode will be discussed below). In the "Word Address Mode" of VGA, addresses generated by the Host CPU undergo a rotating shift operation where all memory address bits are shifted down by one bit, and the most significant bit appears as the least significant bit of the address. In other words, as shown in FIG. 4, address line bits MA 0 through MA 14 are shifted to become address line bits MA 1 through MA 15.

"Word Address Mode" may be used for the "even-/odd" mode of VGA. In this mode, incrementing the address lines causes every other byte to be skipped in memory, until, of course, either MA 15 or MA 13 is toggled to one (see column 403 of FIG. 4). This mode is often used by VGA to allow the easy storage of an 8-bit character byte and an associated 8-bit attribute byte. The storage in this fashion allows for the easy manipulation of this 16-bit pixel.

In addition, the most significant bit (either MA 15 or MA 13, as described below) is shifted to become MA 0. Particularly, if 256 Kilobytes of video memory are installed, then MA 15 is shifted to become MA 0. On the other hand, if only 64 Kilobytes of video memory are installed, MA 13 is accordingly shifted to become MA 0.

Finally, column 404, labelled "Doubleword Address Mode", corresponds to the other mode under VGA where an address generated by the Host CPU is convoluted before actually referencing video memory. Under the "Doubleword Address Mode", address line bits MA 0 through MA 13 are shifted to become address line bits MA 2 through MA 15, while MA 12 and MA 13 become MA 0 and MA 1. In this case, this mode is used when 64 Kilobytes of video memory are present.

Referring back to FIG. 3, the specific operation of the Tactical Address Controller (TAC) will now be explained. Basically, the TAC may receive an indication from an application running on the Host CPU through normal VGA registers 302 that it is to be operating in one of its VGA graphics modes. In addition, the TAC may receive other types of commands affecting the TAC's operation through Hidden Registers 304.

For example, as is commonly known by those of ordinary skill in the art, VGA modes 0 (hex) through 3 (hex) and 7 (hex) are alphanumeric modes while modes 4 (hex) through 6 (hex) and D (hex) through 13 (hex) are primarily graphics modes (Herein, the term "hex" indicates that the number is in hexadecimal format—base 16). The VGA Basic Input/Output System (BIOS) found in VGA systems, and readily understood by those skilled in the art, controls the implementation of these modes by utilizing various VGA registers in the video system.

Specifically, several sets of registers exist in a VGA system which allow for the control of the components of the system: namely, General Registers, Attribute Registers, CRT Controller Registers, Sequencer Registers, and Graphics Registers. As described in the "IBM PS/2 Model 80 Technical Reference" previously mentioned, and commonly known to those skilled in the art, the following table describes the various VGA registers found in a VGA system, in a preferred embodiment:

| Register Name | R/W | Monochrome Emulation | Color Emulation | Either |
|---|---|---|---|---|
| General Registers | | | | |
| Misc. Output Regs. | W | | | 03C2 |
| | R | | | 03CC |
| Input Status Reg. 0 | RO | | | 03C2 |
| Input Status Reg. 1 | RO | 03BA | 03DA | |
| Feature Cont. Reg. | W | 03BA | 03DA | |
| | R | | | 03CA |
| Video Subsys. Enable | RW | | | 03C3 |
| Attribute Registers | | | | |
| Address Reg. | RW | | | 03C0 |
| Other Attrib. Regs. | W | | | 03C0 |
| | R | | | 03C1 |
| CRT Controller Registers | | | | |
| Index Reg. | RW | 03B4 | 03D4 | |
| Other CRT Cont. Regs. | RW | 03B5 | 03D5 | |
| Sequencer Registers | | | | |
| Address Reg. | RW | | | 03C4 |
| Other Seq. Regs. | RW | | | 03C5 |
| Graphics Registers | | | | |
| Address Reg. | RW | | | 03CE |
| Other Graph. Regs. | RW | | | 03CF |

As can be seen from this table, there are six sets of registers in the VGA video system. The first column of the table indicates the register names, the second column indicates whether each register is readable (R), writeable (W), read only (RO), or readable/writeable (RW). The third, fourth, and fifth columns indicate the I/O address where each register is located. The third column is for "monochrome emulation", the fourth column is for "color emulation", and the fifth column is for either types of emulation.

Thus, in a preferred embodiment of the present invention, VGA Registers 302 in FIG. 3 may simply correspond to the same types of VGA registers found in standard VGA systems. As will be seen below, Address State Machine 306 thereafter performs various convolution operations on addresses generated by the Host CPU based upon the data passed into VGA Registers 302.

More particularly, each mode of VGA, described above, operates in one of the address modes described above in relation to FIG. 4. The address mode that is used is defined by the VGA BIOS itself or the application.

Figure 5:
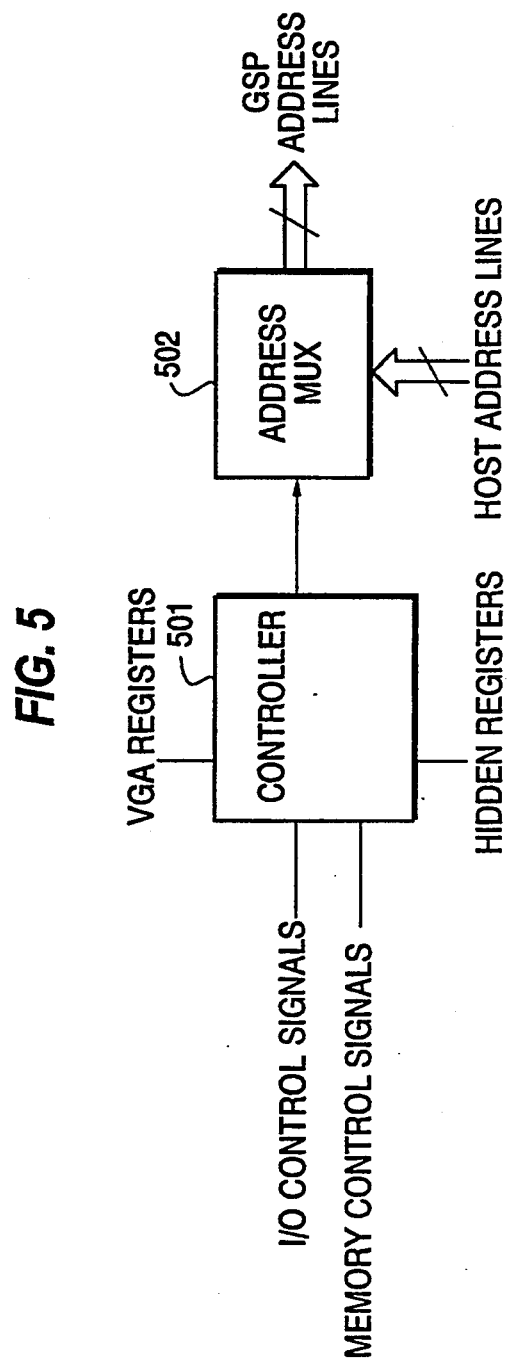
FIG. 5 a block diagram showing in further detail the address state machine depicted in FIG. 3.

Referring to FIG. 5, a detailed block diagram is shown which depicts the functional operation of Address State Machine 306 of FIG. 3. Specifically, Controller 501 drives Address Multiplexer (Address Mux) 502. Controller 501 receives input signals from I/O Control Signals and Memory Control Signals, as well as the VGA Registers and the Hidden Registers previously described.

Thus, Address Mux 502 generates GSP Address lines based upon signals input into both Controller 501 and Address Mux 502, and several different factors are taken into account. Based upon the discussion below with respect to each factor, a person of ordinary skill in the relevant art will readily be able to construct such an Address State Machine out of components which are readily available, such as multiplexers, programmable logic, and related logic gates. The logic equations which may be utilized in arriving at the specific organization of components may also be readily determined based upon the accompanying description of the logic to be performed.

First, specific VGA Registers input into Controller 501 provide the controller with the necessary indication as to which address mode is to be used, as described previously with respect to FIG. 4. If the "Byte Address Mode" (column 402) is to be utilized, then the Host Address Lines may be piped directly through Address Mux 502 to the GSP Address Lines.

However, if the appropriate VGA Registers indicate that either "Word Address Mode" or "Doubleword Address Mode" are to be used, then Controller 501 may appropriately control Address Mux 502 so that the necessary convolution to the address lines take place before being output to the GSP Address Lines. In a preferred embodiment, this may simply comprise feeding the appropriate address lines through one or more multiplexors so as to produce the appropriate address lines.

In addition to acting on input from the VGA Registers, Controller 501 also responds to the I/O Control Signals and the Memory Control Signals received from the Host CPU. While the 34020 GSP makes no distinction between I/O and Memory address cycles, the Host CPU in a preferred embodiment does, and therefore these signals are available. In a preferred embodiment, the I/O Control Signals may take the form "I/O Read" and "I/O Write", while the Memory Control Signals may take the form "Memory Read" and "Memory Write". Each cycle will be one of these four types of cycles, which are self-explanatory.

In a preferred embodiment, Controller 501 is able to detect that an I/O cycle is being performed and is thus able to control register reads and writes accordingly. Particularly, because many of the registers are duplicated between a VGA system and the 34020 GSP processor (such as those registers which control the CRT Controller), these types of registers may simply be stored in excess memory space (such as VRAM 224 or DRAM 220 in FIG. 2, depending on availability of space), and thereafter software operating on the 34020 GSP may be used to take the contents of these registers and perform the necessary programming of the appropriate components. Thus, while these common registers might not be stored in a similar format, software on the GSP may make the necessary conversion to program the GSP accordingly.

In order to accomplish this, Controller 501 may be built to detect the presence of an I/O read or write, and to then generate the appropriate addresses corresponding to the memory put aside for use of these registers. This configuration therefore allows both reading and writing of the current state of these registers, which is necessary in order to maintain compatibility with VGA.

In a further embodiment of the present invention, the memory address location where the state of these selected registers are to be stored may be determined through the use of the Hidden Registers which are input into Controller 501 (and which are described further below) or may be preset depending upon the amount of memory installed in the system.

Also, it is important to note that the output from registers which do not have counterparts on the GSP are also handled by the Tactical Address Controller of the present invention (e.g. FIG. 3), which makes the necessary convolutions in addresses, etc. to program the respective registers.

Finally, in addition to acting upon the output of the VGA Registers and the I/O and Memory Control Signals, Controller 501 receives input from the Hidden Registers, as also depicted in FIG. 5. The Hidden Registers instruct Controller 501 to perform one of many functions, which will be described below.

However, before describing how Controller 501 responds to the input from the Hidden Registers, it is important to understand how the Hidden Registers are constructed. Basically, as briefly described before, Hidden Registers are registers which are only accessible when a preset combination of reads and writes are executed on an existing register. Any combination of reads and writes may be used, with an emphasis placed on those combinations which are unlikely to occur under normal VGA operation. In this way, these registers are effectively "hidden" from the normal VGA BIOS and the program operating on the Host CPU.

In order to construct hidden registers, one of ordinary skill in the art will readily understand that normal register circuitry may be utilized with the addition of support circuitry to implement the desired logic to effectuate the selective access to the registers. For example, a simple state machine may be constructed which receives the various reads and writes as inputs and cycles through various states. If the correct sequence of reads and writes and data are detected, then such a state machine would couple the hidden register to the particular I/O port.

The first type of operation that Controller 501 may perform responsive to the Hidden Registers relates to moving the VGA video RAM around within the memory available to the GSP. The 34020 GSP uses a 32-bit memory address, and is therefore able to address approximately 4 GBytes (512 MBytes) of memory. However, because VGA uses a 16-bit address, it is only able to address a 64 KByte window at any one time. Therefore through the use of Hidden Registers, the present invention is able to create a VGA window anywhere within the memory addressable by the 34020, or another GSP.

In order to accomplish this functionality, the TAC, in a preferred embodiment, provides the necessary address line bits to the Host Address Lines input into Address Mux 502 of FIG. 5. Thus, Controller 501 combines any convolution in the addressing line (previously discussed) coming about responsive to the VGA Registers or the I/O or Memory Control Signals, and adds the necessary address lines to produce GSP Address Lines located at a selective location within the 34020 GSP's address space.

For example, an appropriate Hidden Register may be programmed, through the necessary combination of reads and writes, to place the VGA video memory space at the beginning of the GSP's address space or at any other position within the address space, subject to the actual amount of memory available. The actual location where the VGA data is placed is thus transparent to the normal operation of the application running on the Host CPU and the VGA BIOS.

Another operation which Controller 501 performs responsive to the Hidden Registers is to allow for the extended features of the 34020 through the Texas Instrument Graphics Architecture (TIGA). Specifically, if the appropriate hidden register is set so as to place the system in TIGA mode (as opposed to one of the VGA modes), then any memory or I/O address generated by the Host CPU will not be translated or convoluted by the TAC, but will instead be provided verbatim to the 34020 GSP. This is necessary because TIGA, which was designed for use on the 34020 GSP, manages its own memory addressing, and therefore has no need for the TAC.

The Graphics Controller

Referring back to FIG. 2, Graphics Controllers 264 and 268 are depicted. Basically, Graphics Controllers 264 and 268 perform the identical function of the VGA graphics controller, defined previously. However, Graphics Controllers 264 and 268 of the present invention provide some additional functionality not found in a normal VGA graphics controller in order to maintain compatibility with TIGA.

In the previous discussion of FIG. 1, it was explained that VGA Chip 130 contained a graphics controller. The reason that two Graphics Controllers 264 and 268 are utilized in a preferred embodiment of the present invention is to achieve better throughput of data between Bus 200 and DRAM 220 or VRAM 224. However, as will be understood by one of ordinary skill in the art, one graphics controller may just as easily be used in the present invention, albeit with a reduction in effective throughput. If only one graphics controller is used, then two successive operations will need to be performed in order to transfer two 8-bit bytes of data.

Because Graphics Controllers 264 and 268 may be used, in a preferred embodiment, while the application program running on the Host CPU is generating graphics in either VGA or TIGA mode, the Graphics Controllers must necessarily be able to distinguish between these two modes. As may be seen in FIG. 2, Hidden Registers 265 and 269, which form part of the same hidden registers previously discussed, provide the necessary input to Graphics Controllers 264 and 268 to indicate which mode is being used.

When a VGA mode is being used which stores the VGA graphics data in "bit-plane format", which was previously defined, then Graphics Controllers 264 and 268 operate just as they would on a standard VGA Chip. Specifically, Graphics Controllers 264 and 268 will either expand 8-bit data from the Host CPU into 32-bit data to be stored in either DRAM 220 or VRAM 224, or Graphics Controllers 264 and 268 will take 32-bit data stored in either DRAM 220 or VRAM 224 and contract it down to 8-bit data. How this is done is dictated by the Graphics Controller Registers, which are part of the VGA Registers described before (element 302 in FIG. 3).

For example, bits 0 and 1 of the Read Map Select Register (which is pointed to as index 4 hex by the value in the Graphics Address Register) may be used to select one of the bit-plane maps to read from. Other registers which may be used in a similar fashion are described in detail in "IBM Personal System/2 Model 80 Technical Reference", published by International Business Machines (IBM), and described earlier. Of course, one of ordinary skill in the art will understand that a detailed understanding of when one programs such registers is not necessary in order to implement the present invention, as these functions are normally performed by standard VGA BIOS. However, this technical reference will prove useful for background purposes.

When a graphics mode is being used which does not make use of bit-plane format, such as TIGA mode, Graphics Controllers 264 and 268 may be effectively "turned off" and data transferring between bus 200 and either DRAM 220 or VRAM 224 may proceed directly with no modification of the data. This feature is included in a preferred embodiment of the present invention because neither TIGA nor the 34020 GSP recognizes the bit-plane format.

In order to implement Graphics Controllers 264 and 268 of the present invention (or only one graphics controller if only one is to be used), additional circuitry must be present in order to allow for the graphics controllers to be selectively activated based upon what type of graphics mode is being used. One of ordinary skill in the art will recognize that a graphics controller known in the art may be readily modified according to the present invention so as to include logic to selectively activate such graphics controllers responsive to the state of the appropriate hidden registers. If the bit-plane format is used, the graphics controller will operate in a similar fashion to its operation on a dedicated VGA system. On the other hand, if a non-bit-plane format is used, then data may be piped straight through with no modification to the data.

The Format Translator

When operating under the graphics modes of VGA which store the graphics data in the bit-plane format or the old CGA formats (e.g., modes 4 and 5 hex), the present invention must necessarily translate this data into a form which the GSP is able to utilize—namely packed pixel format, which was previously defined. In order to accomplish this functionality, the present invention, in a preferred embodiment, includes a Format Translator and associated decode logic (element 216 in FIG. 2). A detailed description of the Format Translator in a preferred embodiment is provided below.

Figure 6:
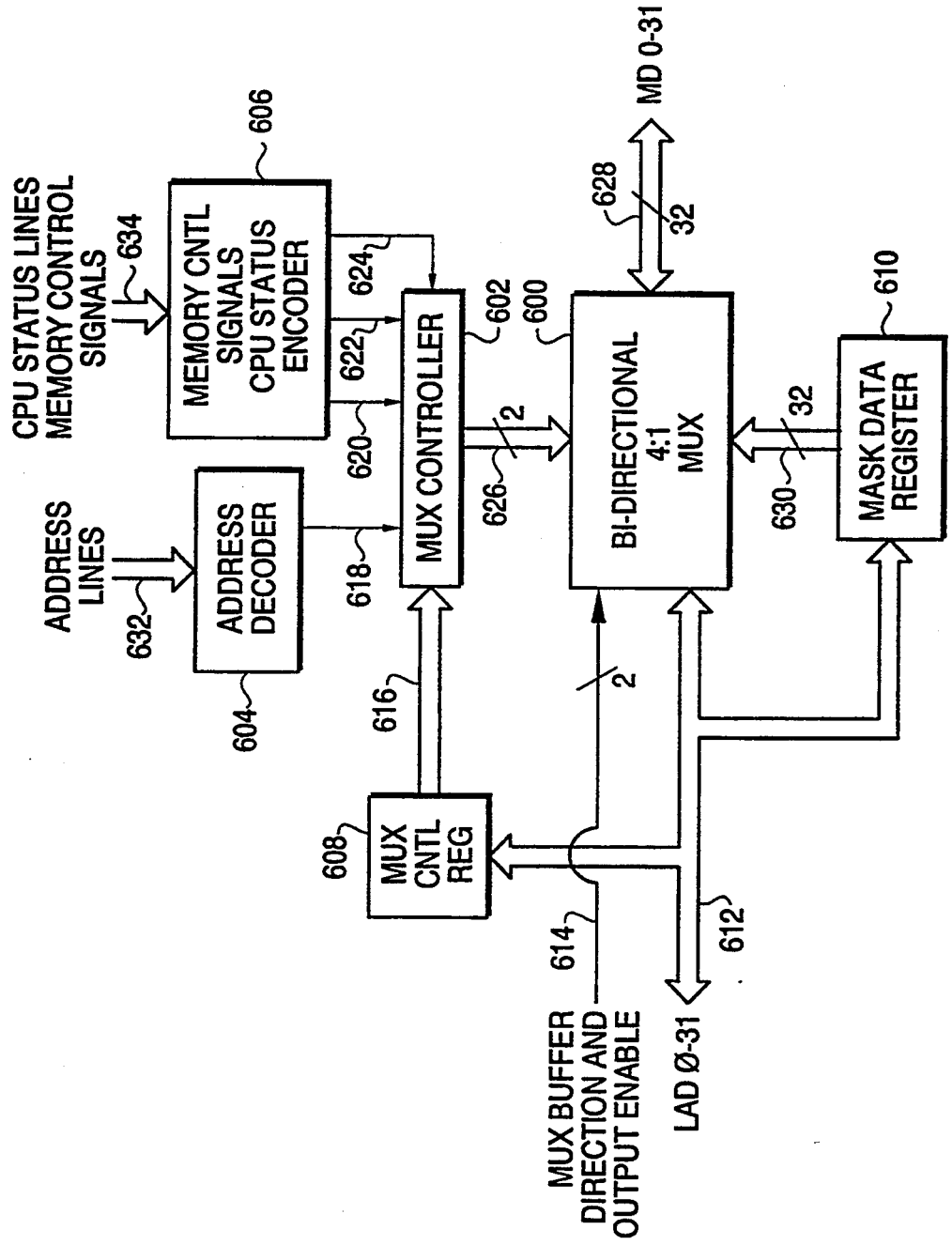
FIG. 6 is a block diagram showing in detail the format translator depicted in FIG. 2.

FIG. 6 depicts a Format Translator for use with the present invention. This Format Translator corresponds to Format Translator 216 shown in FIG. 2, which is coupled to 34020 GSP 212 via address lines 256 and Status and Command Lines 260, as well as being coupled to DRAM 220 and VRAM 224. The functional makeup of the Format Translator will now be described in detail.

Referring back to FIG. 6, Bi-directional 4:1 Multiplexor (Mux) 600 is depicted in the center of the figure. This element comprises the main portion of the Format Translator, and consists of two 4:1 muxes, each going in opposite directions and each having its own output and enable lines. In a preferred embodiment, Mux 600 is capable of operating in one of four modes: (1) Normal Data Transfer, (2) translation between IBM planar format and packed pixel format, (3) translation between IBM VGA Modes 4 & 5 format and packed pixel format, and (4) assertion of mask data from Mask Data Register 610 to VRAM. Of course, if more or less than these four modes were used, then the two muxes in Mux 600 would be "x:1" muxes, where "x" corresponds to the number of modes available.

Basically, Mux 600's direction and output enable is controlled by the normal bus control signals of the 34020 GSP, which are fed into "Memory Control Signals—CPU Status Encoder" 606 (Encoder 606), via lines 634. This is accomplished through Mux Controller 602 via lines 620, 622 and 624. Lines 620, 622 and 624 may each be used to signify to Mux Controller 602 that the GSP is in the process of executing an instruction fetch, a pixel operation, or any other type of operation. In this way, Mux Controller 602 can detect the status of the GSP so that any translations that are performed by the Format Translator only take place on valid data, and not on GSP instructions, for example.

Additionally, Mux Controller 602 gets its command configuration from Mux Control Register 608. Mux Control Register 608 is accessible by the GSP via address lines 612. By obtaining its configuration from Mux Control Register 608, Mux Controller 602 may operate in one of a variety of possible modes.

In addition to the status of the GSP and memory control signals, Mux Controller 602 receives input from Address Lines 632 generated by the GSP through Address Decoder 604. Address Decoder 604 may determine which addresses generated by the GSP correspond to data which need to be translated by the Format Translator (e.g. VGA data), and may provide an indication to Mux Controller 602 accordingly through line 618. By obtaining information from the previously discussed Hidden Registers, Mux Controller 602 may therefore determine where VGA memory is located, may determine whether the GSP is accessing this memory, and may therefore perform any appropriate translations via Mux 600.

Thus, Mux Controller 602 may be configured to implement one of the four previously discussed modes of Mux 600 in one of a variety of ways. For example, Mux Controller 602 may instruct Mux 600 (through 2 lines 626) to perform one of its modes responsive to certain addresses being generated (e.g. responsive to Address Decoder 604), responsive only to certain types of pixel operations (e.g. responsive to Encoder 606), or responsive to any combination of the two. Additionally, Mux 600 may be controlled to translate all of the time except for instruction and interrupt fetches. As can be seen, there are many possibilities for this type of architecture.

One of ordinary skill will understand that the examples given above refer to only a few of the possible configurations.

It will also be understood by one of ordinary skill in the art that Address Decoder 604 and Encoder 606 may easily be constructed according to the type of logical operations which are to be performed on the data input therein. As an example, Address Decoder 604 may be constructed with standard logic gates and components so that it indicates to Mux Controller 602 (via line 618) to enable Mux 600 for the desired operation (out of four possible). In other words, logic could be used that provides a positive indication to Mux Controller 602 that a desired address range or ranges is or is not being generated by the GSP.

Similarly, Encoder 606 may utilize the signals 634 input into this component to provide indications to Mux Controller 602 via lines 620,622 and 624. As previously mentioned, these lines may be used to indicate whether an instruction fetch is taking place on the GSP, whether a pixel operation is taking place, or whether some other similar operation is taking place. It will also be understood by one of ordinary skill in the art that the types of signals fed into Encoder 606 are limited only by the signals available from the GSP. If other additional signals are available, they too can be input into Encoder 606.

Encoder 606 may therefore comprise common logical components to produce appropriate indications to Mux Controller 602 on lines 620, 622, 624, etc. The signals 634 fed into Encoder 606 may simply be replicated on the lines into Mux Controller 602, or additional logical operations may be performed to provide appropriate indications to Mux Controller 602 of the current state of the GSP, etc.

Based upon the status of Mux Control Register 608, therefore, one of the four modes of Mux 600 may be implemented at the direction of Mux Controller 602. Mux Controller 602 simply receives as input the signals from the various components previously described on lines 618, 620, 622, 624 and 616, etc., and, if the appropriate conditions exist, outputs the corresponding mode of operation to Mux 600 via lines 626. One of ordinary skill in the art will understand that the proper mode to utilize will be dependent upon the graphics mode of operation, such as one of the VGA modes or TIGA.

Because of the four possible modes of operation of Mux 600 (described below) in a preferred embodiment, 2 lines 626 are utilized (e.g. four states may be represented in binary form with 2 lines). Of course, four modes are used in a preferred embodiment, and additional modes may easily be added, if desired.

As previously discussed, four modes of operation for Mux 600 are utilized. The first mode, "Normal Data Transfer", simply transfers data straight through the Format Translator without any change in actual format. This mode is used when no translation is needed, but when the Format Translator still needs to operate to a certain extent. An example of when this mode is needed is when VGA mode 13 (hex) was used by the application on the Host CPU. As will be understood by one of ordinary skill in the art, VGA mode 13 (hex) uses a type of packed pixel format, so the Format Translator (via Mux 600) does not need to translate from bit-plane format to packed pixel format. However, because the "Doubleword Address Mode", which was previously explained, is used when mode 13 (hex) is used, the data stored in memory is not truly in a packed pixel format. Instead, each successive pixel is stored in each of the four maps, and then 3 bytes are skipped, and the process repeats. This is true because address lines MA 0 through MA 13 are shifted to become MA 2 through MA 15, while MA 12 and MA_13 become MA 0 and MA 1. Therefore, 2 bits of the address lines are not initially sequentially used, resulting in every fourth byte of each map being used. However, once MA 12 and MA 13 are utilized in the address, the skipped memory locations eventually are used.

Thus, software emulation is used in a preferred embodiment of the present invention in order to get around this limitation. By developing software for the GSP to rearrange these otherwise packed pixels, the Format Translator may be used to simply pipe this otherwise proper data to the VRAM to be displayed. One of ordinary skill will readily understand how to develop software for the GSP to convert graphics data stored in "Doubleword Address Mode" into graphics data stored in a normal manner. Basically, such GSP software would simply read the Hidden Registers previously discussed (element 304 in FIG. 3), determine that the "Doubleword Address Mode" is being used, read in the graphics data in the "Doubleword Address Mode" and thereafter store this data in the normal non-shifted sequential manner. After this is accomplished, the resulting data will be in the proper sequential packed pixel format.

The second mode, "Translation between IBM planar format and packed pixel format" is used in VGA modes, such as mode 10 or 12 (hex), which utilize the 4 bit-plane format, previously discussed, and outlined in the "IBM Personal System/2 Model 80 Technical Reference", previously described. Basically, the format of such modes is: 4 bits/pixel, 16 colors/pixel, 1 bit from each bit plane per pixel, and first pixel being in the most-significant bit of all 4 bit-planes.

In this case, Mux 600, under control of Mux Controller 602 and the GSP, merely takes the 8 pixel values stored within each 32-bit VGA memory location (each pixel being 4 bits long), reads these pixels out one at a time, and store the resulting eight 4-bit pixel values in successive locations in VRAM, thereby creating "packed pixels". The actual configuration of Mux 600 necessary in order to accomplish this functionality may easily be fashioned out of the necessary logical components, in a manner which would be understood by one of ordinary skill.

The third mode of Mux 600, "Translation between IBM VGA modes 4 and 5 format and packed pixel format", operates in a similar manner as the second mode. However, in this case, only maps 0 and 1 are utilized and even scan lines and odd scan lines are stored in different areas within each map. The actual configuration of graphics data stored in the format of modes 4 and 5 may be understood further by referring once again to the "IBM Personal System/2 Model 80 Technical Reference". One of ordinary skill in the art will readily understand the logic which must be performed on graphics data stored in the format of modes 4 and 5 in order to translate this format into packed pixels. Basically, the format of modes 4 and 5 is: 4 pixels/byte, 4 colors/pixel, and first pixel being in 2 most-significant-bits.

The fourth and final mode of Mux 600 in a preferred embodiment, "Assertion of mask data from Mask Data Register 610 to VRAM", allows the present invention to support the "write per pixel" functionality, which will be described in detail below. The construction of Mux 600 to accomplish this functionality will become evident from the discussion below, but basically consists of applying mask data from Mask Data Register 610 to the VRAM via lines 628.

As stated above, additional functionality in the Format Translator is accomplished through the use of Mask Data Register 610. Basically, Mask Data Register 610 supports "write per pixel" operations on Mux 600. The "write per pixel" operation simply refers to a situation where you wish to prevent writing to a specific segment of memory. Certain types of VRAM memory, such as some of Texas Instrument's and Toshiba's VRAMS, allow for this functionality within the VRAM itself—the mask data for these types of VRAMs is only valid for the current VRAM cycle, and must be reloaded for any successive cycles that require mask data. However, because the loading of this mask data occurs during an address cycle, and because the 34020 GSP utilizes the same lines for both addresses and data, utilizing such mask registers on such a VRAM is rendered impossible in this situation.

Therefore, in order to circumvent this limitation, Mux 600 is designed to pipe the contents of Mask Data Register 610 through to the VRAM (if the VRAM has a built-in masking capability) during the address cycle. In operation then, during the address cycle of the GSP, Mux 600 reads the contents of Mask Data Register 610 through lines 630 and provides this mask data to the VRAM connected through lines 628.

In order to implement such functionality, one of ordinary skill in the art will appreciate that Mux 600 and Mask Data Register 610 may easily be constructed to retain the mask data in Mask Data Register 610 from lines 612, and to provide such mask data to Mux 600 during an appropriate address cycle, as dictated from the input into Encoder 606, which effectively is presented to Mux 600 through Mux Controller 602. Again, address locations or CPU status lines can be used to decide when the mask should or shouldn't be applied.

In another embodiment, Mask Data Register 610 may include multiple masks in a table which are all applied to the address generated by the GSP. Other advanced GSPs might have more advanced functions than the 34020 that would allow each of the masks stored in such tables to be compared to the address at hand, resulting in greater flexibility in the addresses that could be masked. This situation would, of course, be possible in an embodiment of the present invention utilizing the 34020 GSP, albeit with some reduction in performance.

Mux Buffer Direction and Output Enable (lines 614) are also utilized by Mux 600 in order to determine which direction Mux 600 is to operate (e.g. whether the GSP is instructing Mux 600 to read or write from memory), and whether the output is enabled. Such lines are run from pins of the GSP. In operation, GSP uses these lines, via basic logic, to control the specific operation to be performed, as previously described.

One of ordinary skill in the art will recognize that the Format Translator of the present invention may be easily applied to any situation where data needs to be translated from one format into another, and not necessarily just graphics data. Specifically, the Format Translator may be easily adapted to any situation where data is written to memory by one CPU, but needs to be translated into a different format before being acted upon by other components. Therefore, this aspect, as well as the other aspects of the present invention, may be used in a wide variety of instances other than in a graphics system, as provided for in a preferred embodiment.

The "Back End"

Referring back to FIG. 2, the remaining elements of the present invention will now be discussed. Particularly, Attribute Controller 228, Digital-to-Analog Converter (DAC) 232, and Cathode Ray Tube (CRT) 236 will be explained in detail.

In standard VGA systems, the output of the VRAM feeds back into the VGA device to perform extended features under control of an attribute controller. Basically, under VGA, the attribute control registers, previously discussed, control various aspects of the operation of the attribute controller, such as the attribute address, palette mapping, attribute mode control, overscan color for the display border, color plane enabling, horizontal pixel panning, and color selection. Details of the programming of such registers is commonly known to those of ordinary skill in the relevant art, and is further described for background purposes in the "IBM Personal System/2 Model 80 Technical Reference", described previously, in Section 4.

Particularly, in a preferred embodiment of the present invention, many of the functions of the attribute controller are emulated in software. For example, the "Enable Line Graphics Character Codes" function of the Attribute Mode Control Register (located in bit 2 of the Attribute Control Registers at Port 03C0 hex, with an index of 10 hex) may be easily software emulated. In short, this function involves enabling the special line graphics character codes by forcing the ninth (9th) dot of a line graphics character to be identical to the eighth (8th) dot of the character. By doing this, a visual continuum will result and the graphics characters will appear to be seamlessly interconnected. The software emulation for this function may be accomplished by replicating the eighth bit into a ninth bit memory location, rather than relying on hardware to perform this function.

Additionally, because the 34020 GSP only generates a synchronization signal (sync), a screen blanking signal (blank), and obtains graphics data (data) from the VRAM, whereas VGA chips also generate a different Display Enable signal, special provisions must be made in a preferred embodiment of the present invention to allow it to properly display VGA data.

Specifically, the 34020's blank signal is actually similar to VGA's display enable signal timing-wise. Also the 34020's sync signal is programmable. Therefore, by programming the 34020's sync signal, it can be made to look like a VGA blank signal. However, because the sync signal no longer corresponds to the normal sync signal, a new generator must be created. In a preferred embodiment, this sync generator triggers off of the blank signal.

Figure 7A:
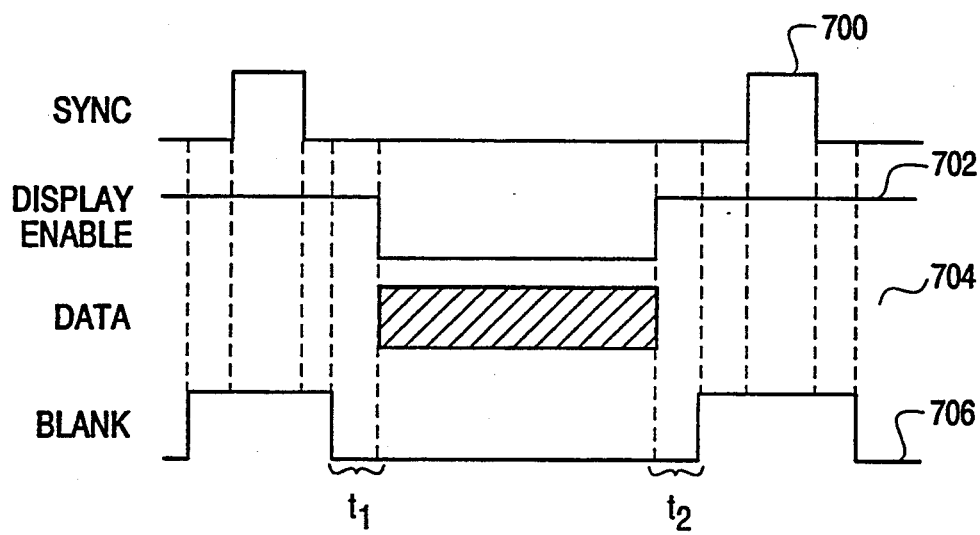
FIG. 7(a) depicts a diagram showing the timing of signals used in the "back end" of a standard VGA system.
Figure 7B:
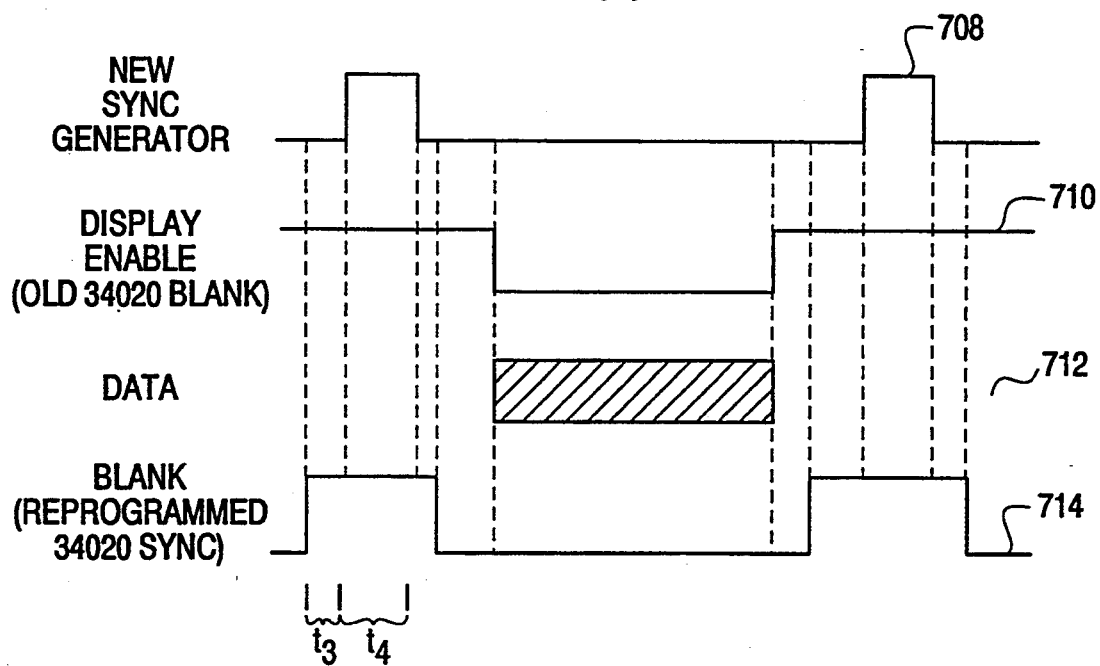
FIG. 7(b) depicts a diagram showing the timing of signals used in the "back end" of the present invention, as modified from a standard VGA system.

Referring to FIGS. 7(a) and 7(b), timing diagrams are shown which depict the timing signals for a standard VGA system and for the present invention, respectively, in a preferred embodiment. Referring to FIG. 7(a), under VGA, timing horizontal sync 700, Display enable 702 and Blank 706 operate as shown in order to draw data 704 on the video display. Times $t_1$ and $t_2$ represent the times during which the border color is being drawn on the left and right sides of the display, respectively. An analogous vertical sync signal is also used in order to redraw starting at the top of the display.

Referring to FIG. 7(b), the timing signals are shown according to a preferred embodiment of the present invention. As mentioned before, because the 34020 does not produce a Display Enable signal, the 34020 Blank signal may be used to correspond to the Display Enable signal, as shown in timing line 710. Of course, if the 34020's Blank signal is being used for a Display Enable signal, another Blank signal must be found. Because the 34020's sync signal may be fully programmed, it may be programmed to be a longer Blank signal, as shown in timing line 714.

Thus, in order to supply a necessary sync signal to the present system, a sync generator must be created. This may be easily accomplished by utilizing a counter to begin counting after the Blank 714 is generated, whereby after a certain amount of time the sync 708 is generated. A preset amount of time after sync 708 is generated, it is thereafter removed. These two time periods are illustrated in FIG. 7(b) as times $t_3$ and $t_4$. The end result of this construction allows for all of the proper signals (708, 710 and 714) to be generated to properly display data 712.

In order to implement single pixel panning, where the video display is moved left or right by one or more pixels, additional special functionality must be incorporated into the present invention, in a preferred embodiment. Because the 34020 GSP is able to pan left or right by 32 bits at a time, rather than pixel by pixel, a slightly different approach must be taken in order to maintain compatibility with VGA.

Specifically, circuitry must be included along with the components which generate the timing signals (FIG. 7(b)) in order to effectuate single pixel panning. Basically, in accordance with a preferred embodiment, the sync 708, the Display Enable 710 and the Blank 714 must all be shifted in time together relative to data 712. By doing this, the display may be horizontally offset by one or more pixels given that these signals will be offset from the data for the particular horizontal line.

Additionally, because this offset will result in data on either side of data 712 being displayed, additional pixels on either side of data 712 may be included and aligned accordingly so that any such pixel panning may include that extra data. In a preferred embodiment, 9 extra pixels may be used on either side of data 712, where such pixels may, optionally, be taken from the corresponding pixels on the opposite side of the screen.

Finally, VGA allows split screens to exist on the video display whereby one portion of the display is utilizing scrolling or pixel panning, while the other portion is not. Because of the unique way in which pixel panning is accomplished according to a preferred embodiment of the present invention, as described above, special considerations and implementations must be used for this aspect.

In order to accomplish split screen functionality, the present invention, in a preferred embodiment, utilizes the "line interrupt" capabilities of the 34020 GSP. Line interrupts allow this, and other GSPs, to be interrupted at specific lines during the display of these lines. Line interrupts are commonly used for cursor control.

Split screens may be implemented by taking advantage of these line interrupts. For example, two flip-flops (such as 274s) may be hooked up as a piped register to receive a line interrupt signal.

For illustrative purposes, suppose that the top portion of the split display is using pixel panning, while the bottom portion is not. A line interrupt is set for the line before the transition from the top portion of the split screen to the bottom portion.

Thus, on the line before the split is to take place, the flip-flops are clocked to receive the line interrupt signal in such a way so as to kill the pixel panning during the blanking time interval, rather during the display time interval. This prevents the display from shaking because the transition occurs while the display is in a blanking state. Once the vertical retrace occurs, the panning that was in effect for the top of the display is restored, and the whole cycle begins again.

Line interrupts are used to accomplish many types of functions, such as split screens (described above), cursor control, as well as other uses (which will be described below). Because of this, a type of "interrupt controller" must be utilized in a preferred embodiment of the present invention in order to distinguish the various type of interrupts from one another. As an alternative to using a commonly available, full-blown interrupt controller to accomplish this functionality, a unique type of interrupt handling device is used in a preferred embodiment. In order to distinguish it from an interrupt controller, this device will be referred to as a "command interrupt tag" (CIT). Of course, this designation is used only to demonstrate that the CIT is not a true interrupt controller, and should not be construed to have any meaning not given to it in the present specification.

Specifically, in a preferred embodiment, the CIT includes a 32-bit register that flags which interrupt routine should be run when an interrupt is generated by an application running on the Host CPU accessing software emulated VGA registers or other emulated areas of VGA. Each bit of the register corresponds to a group of related functions which may be effected by the Host CPU, and which calls for display changes to be made by the GSP. Examples of such functions represented by a bit of the CIT register (and the related register name in parentheses) in a preferred embodiment include: Clock Select (MISCR, CLKSEL), Screen On/Off—Clock Setup (SR01H), Character Map Select (SR03H), Attribute Mode Control (AR10H), Overscan Color (AR11H), Color Plane Enable (AR12H), Horizontal Pixel Pan (AR13H), Horizontal CRT Controls (CR00,01,02,03,04,05H, HRTC), Vertical CRT Controls (CR06,07,10,11,12,15,16H, VCRTC), Cursor Control (CR0A,0B,0E,0FH, CURCONT), Pan and Scroll Info (CR08H, CR18H, PANSCROLL), Memory Start Offset (CR0CH, CR0DH, MEMST), Memory Setup (offset/pitch) (CR13H, MEMSETUP), General Mode Control (CR17H, MODECONT), Misc. Data and Mode Control (CR09H, CR14H, MISCCONT), BIOS Access (Seq. Reg. Index 128, EXTREG), Graphics Controller Mode Info (GR05H, GR06H, GCMODE), etc.

According to the present invention, in order to improve performance, the CIT may generate an interrupt of the GSP only when the Host CPU effects a change to a register which necessitates action to be taken, such as a new graphics mode. If no action is necessary, the GSP is not interrupted. This functionality may be accomplished, in a preferred embodiment, when such a register is dual ported, meaning that the contents of the register may be read out. The logic function XOR (exclusive OR) may thereby be utilized to compare the new value written by the Host CPU for the register with the value currently within the register. If the result of the XOR indicates that the values are the same, no action need be taken by the CIT, and thus, the GSP need not be interrupted.

In order to further improve efficiency, registers represented by the CIT may also be grouped together, where functions with similar characteristics may be in the same group. In this case, when one register gets updated, it is likely that the registers within the same group will also be updated. In this way, the CIT is able to interrupt the GSP once to update several different functions, instead of once for each updated register. Thus, one bit of the CIT might represent more than one register.

Once an interrupt has been generated to the GSP, the GSP may then scan through the CIT registers and see which register caused the interrupt to occur. Once this has been determined by seeing which CIT bit is set, the appropriate routine or routines may then be executed on the GSP to handle the changes in these registers. In this way, the GSP need not process those registers which have not been modified.

Another feature of the CIT which may be included to improve performance, and is included in a preferred embodiment, is that the CIT's bits are cleared after the GSP scans the bits to see which routine to execute. In this way, the GSP does not need to specifically go and clear the CIT register bits, but may rely on the CIT to clear its own bits upon the GSP's reading of the CIT register. The actual clear operation may be responsive to a clear pin on the CIT register latches.

Finally, a mask register may be included within the CIT to allow the user to mask off certain registers from being allowed to interrupt the GSP. For example, if the user did not want a change in a certain register to generate an interrupt on the GSP, a mask bit corresponding to the CIT register bit for the particular register could be set or reset to indicate that this particular register is not to be processed by the GSP.

The above discussion of the CIT describes a device for use with the present invention in a preferred embodiment which may be readily constructed by one of ordinary skill in the art by using commonly available latches, logic gates, and/or programmable logic.

The present invention has been described in detail in connection with the preferred embodiments. These embodiments, however, are merely for example only and the invention is not limited thereto. It will be easily understood by those skilled in the art that other variations and modifications may be easily made within the scope of the invention as defined by the appended claims. In addition, while the present invention has been described as utilizing a 34020 Graphics System Processor (GSP) to provide for compatibility with VGA, it will be understood that the foregoing description of the present invention may easily adapted for use with other GSPs in order to provide compatibility with other graphics standards. Also, adaptation of the present invention to non-graphics applications may also be made while staying within the scope of the claims.

I claim:

1. In a computer system comprising a host processor, a coprocessor, and memory at least partially addressable by both said host processor and said coprocessor through a common bus, an interface for interfacing an operating system operating on said host processor with said coprocessor, said interface comprising:
    means for translating memory addresses generated by said operating system into translated memory addresses recognized by said coprocessor,
    means for storing data elements generated by said operating system into memory locations defined by said translated memory addresses, and
    means for translating said data elements read from said memory locations from a first video format into translated data elements of a second video format recognized by said coprocessor.

2. The interface according to claim 1, wherein: said coprocessor consists of a Texas Instruments TMS34020 graphics system processor, said host processor consists of an 80×86-compatible microprocessor, and
    said operating system consists of a Video Graphics Array (VGA) operating system.

3. The interface according to claim 2, further comprising: an attribute controller coupled to said memory for controlling display attributes of said translated data elements, a digital-to-analog converter coupled to said attribute controller for converting said translated data elements into analog form, and a cathode ray tube coupled to said digital-to-analog converter for displaying graphics representing said translated data elements.

4. The interface according to claim 2, wherein said memory address translating means comprises a tactical address controller.

5. The interface according to claim 4, wherein said tactical address controller comprises:
    a plurality of VGA registers,
    a plurality of hidden registers,
    an address multiplexor for translating said memory addresses into said translated memory addresses, and
    a controller for controlling said address multiplexor responsive to said plurality of VGA registers, said plurality of hidden registers, and said host processor.

6. The interface according to claim 2, wherein said data element storing means comprises at least one graphics controller.

7. The interface according to claim 6, wherein said graphics controller comprises: a plurality of hidden registers, means for selectively expanding said data elements from bit-plane format into an expanded format, responsive to said plurality of hidden registers.

8. The interface according to claim 2, wherein said data element translating means comprises a format translator.

9. The interface according to claim 8, wherein said format translator is able to operate in one of four modes.

10. The interface according to claim 9, wherein said format translator is able to operate in a Normal Data Transfer mode.

11. The interface according to claim 9, wherein said format translator is able to operate in a mode allowing for translation between IBM planar format and packed pixel format.

12. The interface according to claim 9, wherein said format translator is able to operate in a mode allowing for translation between IBM VGA Modes 4 & 5 format and packed pixel format.

13. The interface according to claim 9, wherein said format translator is able to operate in a mode allowing for assertion of mask data from a mask data register to said memory.

14. The interface according to claim 9, wherein said format translator comprises:
    an address decoder for decoding said translated memory addresses, an encoder for encoding memory control and status signals from said coprocessor, a bi-directional 4:1 multiplexor for selecting one of four available memory address translation modes, a multiplexor control register accessible by said coprocessor, and a multiplexor controller for controlling said bi-directional 4:1 multiplexor responsive to said address decoder, said encoder, and said multiplexor control register.

15. The interface according to claim 14, wherein said format translator further comprises:

a mask data register for masking specified memory addresses from said bi-directional 4:1 multiplexor.

16. The interface according to claim 1, wherein the memory address translation means translates VGA memory addresses defined by a VGA addressing mode into linear addresses compatible with the TIGA standard.

17. The interface according to claim 1, further comprising selective control means, responsive to a selection signal generated by the host processor, for selectively controlling the memory address translation means to thereby selectively enable and disable address translation.

18. The interface according to claim 1, wherein the data element translation means translates said data elements from planar format to packed-pixel format.

19. The interface according to claim 1, further comprising second storing means for storing said translated data elements of said second video format into said memory, wherein said memory contains both said generated data elements and said translated data elements of said second video format.

20. The interface according to claim 1, further comprising switching means, responsive to a selection signal generated by said host processor, for selectively switching said address translation means from a VGA addressing mode to a TIGA addressing mode.

21. An interface for interfacing a host processor to a graphics system processor, comprising:

a computer program operating on said host processor for generating memory addresses and data elements associated with said memory addresses, a memory coupled to said host processor and to said graphics system processor, a memory address translator for translating said memory addresses into translated memory addresses in said memory, said translated memory addresses being recognizable by said graphics system processor, a graphics controller for storing said data elements into first memory locations in said memory defined by said translated memory addresses, and a format translator for translating said data elements into translated data elements recognized by said graphics system processor.

22. The interface according to claim 21, wherein:

said graphics system processor consists of a Texas Instruments TMS34020 graphics system processor, said host processor consists of an 80×86-compatible microprocessor, and said computer program consists of a Video Graphics Array (VGA) operating system.

23. The interface according to claim 22, wherein said memory address translator comprises:

a plurality of VGA registers, a plurality of hidden registers, an address multiplexor for translating said memory addresses into said translated memory addresses, and a controller for controlling said address multiplexor responsive to said plurality of VGA registers, said plurality of hidden registers, and said host processor.

24. The interface according to claim 22, wherein said graphics controller comprises:

a plurality of hidden registers, means for selectively expanding said data elements from bit-plane format into an expanded format, responsive to said plurality of hidden registers.

25. The interface according to claim 22, wherein said format translator is able to operate in one of four modes.

26. The interface according to claim 25, wherein said format translator is able to operate in a Normal Data Transfer mode.

27. The interface according to claim 25, wherein said format translator is able to operate in a mode allowing for translation between IBM planar format and packed pixel format.

28. The interface according to claim 25, wherein said format translator is able to operate in a mode allowing for translation between IBM VGA Modes 4 & 5 format and packed pixel format.

29. The interface according to claim 25, wherein said format translator is able to operate in a mode allowing for assertion of mask data from a mask data register to memory.

30. The interface according to claim 22, wherein said format translator comprises:

an address decoder for decoding said translated memory addresses, an encoder for encoding memory control and status signals from said graphics system processor, a bi-directional 4:1 multiplexor for selecting one of four available memory address translation modes, a multiplexor control register accessible by said graphics system processor, a multiplexor controller for controlling said bi-directional 4:1 multiplexor responsive to said address decoder, said encoder, and said multiplexor control register.

31. The interface according to claim 30, wherein said format translator further comprises:

a mask data register for masking specified memory addresses from said bi-directional 4:1 multiplexor.

32. The interface according to claim 21, further comprising means for storing said translated data elements into second memory locations in said memory, wherein said memory contains both said generated data elements and said translated data elements.

33. The interface according to claim 21, further comprising switching means, responsive to a selection signal generated by said host processor, for selectively switching said memory address translator from a VGA addressing mode to a TIGA addressing mode.

34. In a computer system comprising a host processor, a coprocessor, and memory at least partially addressable by both said host processor and said coprocessor through a common bus, a method for interfacing an operating system operating on said host processor with said coprocessor, said interfacing method comprising the steps of:

translating memory addresses generated by said operating system into translated memory addresses recognized by said coprocessor, storing data elements generated by said operating system into memory locations defined by said translated memory addresses, reading data elements from said memory locations, and translating said data elements read from said memory locations from a first video format into translated data elements of a second video format recognized by said coprocessor.

35. The interfacing method according to claim 34, wherein:
said coprocessor consists of a Texas Instruments TMS34020 graphics system processor,
said host processor consists of an 80×86-compatible microprocessor, and
said operating system consists of a Video Graphics Array (VGA) operating system.

36. The interfacing method according to claim 34, wherein said memory address translating step comprises the step of:
translating said memory addresses into translated memory addresses responsive to a plurality of VGA registers, a plurality of hidden registers, and said host processor.

37. The interfacing method according to claim 34, wherein said data element storing step comprises the step of:
selectively expanding said data elements from bit-plane format into an expanded format, responsive to a plurality of hidden registers.

38. The interfacing method according to claim 34, wherein said data element translating step takes place in one of four modes.

39. The interfacing method according to claim 38, wherein said data element translating step takes place in a Normal Data Transfer mode.

40. The interfacing method according to claim 38, wherein said data element translating step takes place in a mode allowing for translation between IBM planar format and packed pixel format.

41. The interfacing method according to claim 38, wherein said data element translating step takes place in a mode allowing for translation between IBM VGA Modes 4 & 5 format and packed pixel format.

42. The interfacing method according to claim 38, wherein said data element translating step takes place in a mode allowing for assertion of mask data from a mask data register to memory.

43. The interfacing method according to claim 34, wherein said data element translating step comprises the steps of:
decoding said translated memory addresses,
encoding memory control and status signals from said coprocessor,
selecting one of four available memory address translation modes, and
controlling said selecting step responsive to said decoding step, said encoding step, and a multiplexor control register accessible by said coprocessor.

44. The interfacing method according to claim 43, wherein said data element translating step further comprises the step of:
masking specified memory addresses from said data element translating step.

45. The method according to claim 34, further comprising a step of storing said translated data elements of said second video format into said memory, so that said memory contains both said generated data elements and said translated data elements of said second video format.

46. The method according to claim 34, further comprising a step of generating a switching signal from said host processor for selectively controlling said translating step to selectively switch between translating VGA-compatible addresses and TIGA-compatible addresses.

47. In a computer system comprising a host processor, a coprocessor, and memory addressable by both the host processor and the coprocessor through a common bus, an interface for interfacing the host processor with the coprocessor, the interface comprising:
a plurality of VGA registers for storing VGA control information;
a first hidden register for storing translation state data, the first hidden register being writable from the host processor by executing a predetermined sequence of register instructions in the host processor to thereby unlock the first hidden register;
memory address translation means having inputs for receiving memory addresses generated by the host processor and outputs for providing translated memory addresses to the coprocessor, the memory address translation means for translating the received memory addresses generated by the host processor into the translated memory addresses in response to the translation state data stored in the first hidden register and to the VGA control information stored in the plurality of VGA registers;
data storing means for storing data elements generated by the host processor into memory locations defined by the translated memory addresses; and
data format translation means for translating the format of data elements read from memory locations defined by the translated memory addresses from a first video format to a second video format, the second video format being compatible with the coprocessor.

48. The interface according to claim 47, wherein the memory address translation means performs a rotating bit shift operation on the received memory addresses to thereby produce the translated memory address.

49. The interface according to claim 47, wherein the memory address translation means comprises means for receiving I/O control signals from the host processor and generating in response thereto translated memory addresses for storing register data corresponding to the I/O control signals into the memory.

50. The interface according to claim 47, wherein the memory address translation means passes the received memory address through to the coprocessor without translation in response to the translation state data having a predetermined value.

51. The interface according to claim 47, wherein the address translation means comprises:
means for performing a VGA addressing mode convolution, responsive to a VGA addressing mode value stored in one of the plurality of VGA registers, for convolving the received memory addresses in accordance with the VGA addressing mode value; and
means for performing a memory offset shift, responsive to a data value stored in the first hidden register, for shifting the convolved memory address to an offset location to thereby produce the translated memory address.

52. The interface according to claim 47, wherein the data storing means comprises a first graphics controller, the first graphics controller comprising:
- a second hidden register for storing pixel format configuration data, the second hidden register writable from the host processor by executing a predetermined sequence of register instructions in the host processor to thereby unlock the second hidden register; and
- means for selectively expanding the data elements generated by the host processor in accordance with the pixel format configuration data stored in the second hidden register.

53. The interface according to claim 52, wherein the data storing means comprises a second graphics controller, the second graphics controller comprising:
- a third hidden register for storing pixel format configuration data, the third hidden register writable from the host processor by executing a predetermined sequence of register instructions in the host processor to thereby unlock the third hidden register; and
- means for selectively expanding the data elements generated by the host processor in accordance with the pixel format configuration data stored in the third hidden register;
- wherein the first and second graphics controllers store first and second portions, respectively, of each data element into the memory.

54. In a computer system comprising a host processor, a coprocessor, and memory addressable by both the host processor and the coprocessor through a common bus, an interface for interfacing the host processor with the coprocessor, the interface comprising:
- a plurality of VGA registers for storing VGA control information;
- a hidden register for storing translation state data, the hidden register being writable from the host processor by executing a predetermined sequence of register instructions in the host processor to thereby unlock the hidden register;
- memory address translation means having inputs for receiving memory addresses generated by the host processor and outputs for providing translated memory addresses to the coprocessor, the memory address translation means for translating the received memory addresses generated by the host processor into the translated memory addresses in response to the translation state data stored in the hidden register and to the VGA control information stored in the plurality of VGA registers; and
- data storing means for storing data elements generated by the host processor into memory locations defined by the translated memory addresses.

55. The interface according to claim 54, further comprising display timing means, connectable to a video display unit, for timing and enabling display of data read from the memory on the video display unit, the display timing means comprising:
- a TMS 340×0 graphics processor comprising a processor blanking signal connectable to a display enable signal line of the video display unit and a processor sync signal having a period programmed to provide a display blanking signal output connectable to the video display unit;
- a first counter, coupled to the display blanking signal output, for counting a first predetermined time period beginning when the display blanking signal output is activated and generating a first count signal thereby;
- a second counter, coupled to the first count signal, for counting a second predetermined time period beginning when the first count signal is generated to generate a second count signal thereby; and
- a pulse generator, responsive to the first and second counters, for generating a sync pulse beginning when the first count signal is generated and ending when the second count signal is generated.

56. The interface according to claim 54, further comprising a Command Interrupt Tag (CIT) circuit, coupled to the coprocessor and to the memory address translation means and responsive to host processor writes to the plurality of VGA registers, for selectively screening interrupts to the coprocessor, the CIT circuit comprising:
- a CIT register having a plurality of bits, each bit corresponding to one or more display functions which may be invoked by the host processor through writes to one of the plurality of VGA registers; and
- interrupt generation means, coupled to the CIT register, for selectively interrupting the coprocessor in response to bits set in the CIT register.

57. The interface according to claim 56, wherein the CIT circuit further comprises comparison means, coupled to the interrupt generation means and responsive to bits set in the CIT register and to data written to one of the plurality of VGA registers by the host processor, for comparing the CIT register bits with the data written to the one VGA register and causing an interrupt to be generated when a difference between the compared data is detected.

58. The interface according to claim 56, wherein the CIT circuit further comprises a mask register having a plurality of bits, each mask register bit corresponding to one of the bits in the CIT register, the mask register bits for indicating whether an interrupt should be generated when the corresponding CIT register bit is set, wherein the interrupt generation means is further responsive to the mask register bits for selectively interrupting the coprocessor when both a particular CIT register bit and the corresponding mask register bit are set.

59. A method of interfacing a host computer, having a computer bus with a graphics coprocessor having a memory, the method comprising the steps of:
(1) defining a plurality of hidden registers at I/O locations on the computer bus accessible by executing a predetermined sequence of register instructions on the host computer to thereby read or write data values into the hidden registers;
(2) writing, from the host computer, a translation state data value into a first one of the hidden registers;
(3) reading the translation state data value from the first hidden register;
(4) determining whether the translation state data value equals a first predetermined data value;
(5) latching, from the host computer, a memory address and a graphics data element corresponding to the memory address onto the computer bus;
(6) translating, in response to the translation state data value equalling the first predetermined data value, the latched memory address into a translated memory address and storing the graphics data element into a memory location defined by the translated memory address; and (7) storing, in response to the translation state data value not equalling the first predetermined data value, the graphics data element into a memory location defined by the latched memory address.

60. The method of claim 59, further comprising the steps of:
    writing, from the host computer, a data format value into a second one of the hidden registers;
    reading the data format value from the second hidden register;
    determining whether the data format value indicates that data format translation is required; and
    translating, in response to determining that data format translation is required, the graphics data element from a first format to a second format and storing the translated graphics data element into the memory.

61. The method of claim 59, wherein the address translation of step (6) comprises the steps of:
    performing a VGA addressing mode convolution, responsive to a VGA addressing mode value stored in one of a plurality of VGA registers, for convolving the latched memory address in accordance with the VGA addressing mode value; and
    performing a memory offset shift, responsive to a data value stored in one of the plurality of hidden registers, for shifting the convolved memory address to an offset location to thereby produce the translated memory address.

62. A computer system comprising:
    a computer bus;
    a host processor coupled to the computer bus;
    a coprocessor coupled to the computer bus;
    a memory addressable by both the host processor and the coprocessor through the computer bus; and
    an interface for interfacing the host processor with the coprocessor, the interface comprising
    means for translating memory addresses generated by the host processor into translated memory addresses recognized by the coprocessor,
    means for storing data elements generated by the host processor into memory locations defined by the translated memory addresses, and
    means for translating data elements read from the memory locations from a first video format into translated data elements of a second video format recognized by the coprocessor.

63. The system according to claim 62, further comprising second storing means for storing said translated data elements of said second video format into said memory, so that said memory contains both said generated data elements and said translated data elements of said second video format.

64. The system of claim 62 further comprising switching means, responsive to a selection signal generated by said host processor, for selectively switching said memory address translation means from a VGA addressing mode to a TIGA addressing mode.

65. A graphics interface for interfacing a host computer having a computer bus to a graphics coprocessor having an associated video memory, the associated video memory addressable by both the host computer and the graphics coprocessor, said graphics interface comprising:
    an address translator, coupled to the computer bus and to the graphics coprocessor, for receiving memory addresses from the computer bus and translating said received memory addresses into translated memory addresses compatible with the memory addressing scheme of the graphics coprocessor;
    a graphics controller, coupled to the computer bus, for receiving graphics data elements from the computer bus, expanding the graphics data elements into a bit-plane format, and storing the expanded graphics data elements at a first location in the associated video memory; and
    a format translator, responsive to the graphics coprocessor, for reading the expanded graphics data elements from the first location in the associated video memory, translating the expanded graphics data elements from the bit-plane format into a packed pixel format, and storing the translated expanded graphics data elements into a second location in the associated video memory.

* * * * *